Figure 1:
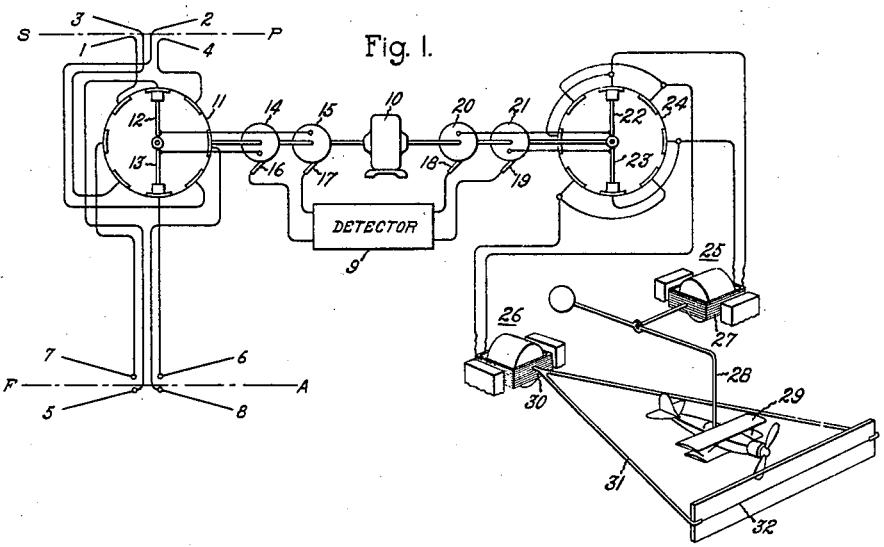

July 30, 1935.　　　H. I. BECKER　　　2,009,832
AERONAUTICAL DEVICE
Filed Dec. 29, 1933　　　2 Sheets-Sheet 1

Inventor:
Howard I. Becker,
by Harry E. Dunham
His Attorney.

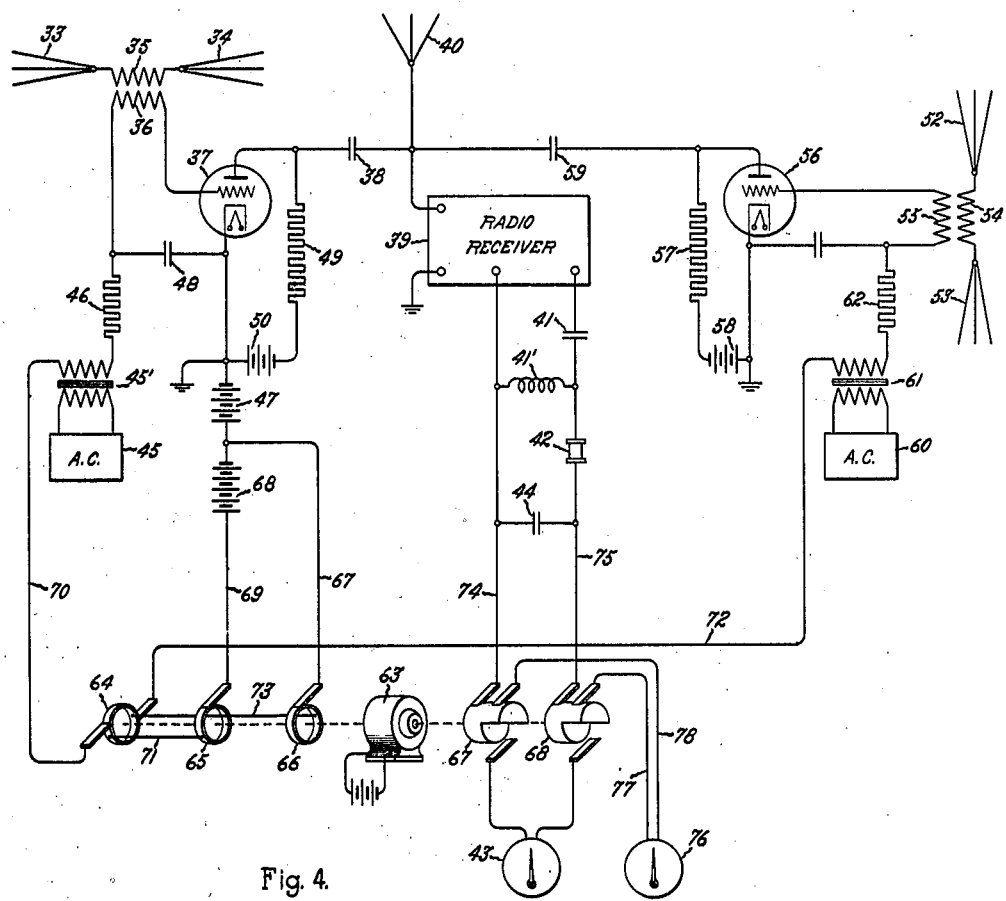
Fig. 5.
Fig. 4.
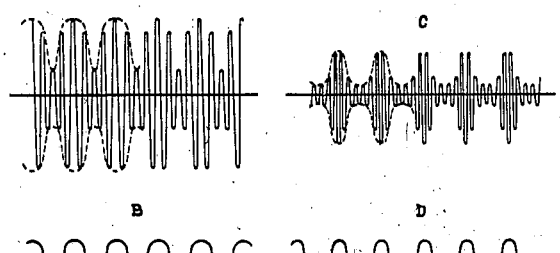
Inventor:
Howard I. Becker,
by Harry E. Dunham
His Attorney.

Patented July 30, 1935

2,009,832

UNITED STATES PATENT OFFICE 2,009,832

AERONAUTICAL DEVICE

Howard I. Becker, Schenectady, N. Y., assignor to General Electric Company, a corporation of New York Application December 29, 1933, Serial No. 704,542

15 Claims. (Cl. 250—11)

My invention relates to aeronautical devices and more particularly to a system for determining and indicating the lateral stability and the longitudinal stability of an aircraft.

When flying an aircraft, particularly an aeroplane, through a fog or at high altitudes at night, it is often impossible to observe the horizon with the result that it is difficult to keep the craft in a horizontal plane. In an aeroplane, a slight deviation laterally from the horizontal plane introduces a certain amount of side slip which eventually reduces the speed and altitude of the craft A deviation longitudinally from the horizontal plane obviously changes the altitude of the craft. In order to obviate these disadvantages, it is necessary to provide some means for determining the lateral and longitudinal stability of the craft. This can be accomplished by establishing an artificial horizon which can be observed to guide the craft properly.

An object of my invention is to provide means for determining the stability of an aircraft with respect to the lateral and longitudinal axes of the craft.

A further object of my invention is to provide means responsive to space waves for determining the position of an aircraft with respect to a horizontal plane.

In accordance with my invention I have found that the stability of an aircraft can be determined by utilizing a dipole antenna arranged in a substantially horizontal plane to receive space waves such as radio waves, static disturbances, etc., and comparing this received energy with the energy received from an antenna arranged in a different plane. When a dipole antenna, preferably coupled to an aperiodic circuit, is arranged in a horizontal plane, the energy received will be a minimum as compared to that received when the antenna is in other positions. The energy from such an antenna when compared as to magnitude or phase with the energy from an antenna in a different plane will bear a relation directly in accordance with the deviation of the dipole antenna from the horizontal plane.

This operation of the dipole antenna, in accordance with my invention, may best be understood by considering the atmospheric potential gradient with respect to the earth. This potential gradient may, of course, be due to radio waves, static disturbances or any other form of electrical disturbance which may be present in the atmosphere. It is normally vertical with respect to the earth except when disturbed by some predominating local influence. Accordingly if a horizontal dipole antenna be placed in such a field both ends of the dipole antenna will be at equal atmospheric potentials with respect to the earth or at potentials which differ by minimum amounts, with the result that no electromotive force, or a minimum of electromotive force, is produced between the poles of the antenna. If one end of the antenna be raised with respect to the earth and with respect to the position of the other end, it then occupies a different position in the atmospheric potential gradient than does the opposite end, with the result that an electromotive force is produced between the poles of the antenna. The magnitude of this electromotive force is, of course, dependent upon the pitch of the antenna with respect to the horizontal and its phase is dependent upon the end which is raised. That is, the instantaneous polarity, or phase, of this electromotive force is reversed by raising the opposite end of the antenna above the position horizontal with the first.

Thus the position of an aircraft relative to the horizontal may readily be determined by observation of either the magnitude or phase of the electromotive forces set up in a dipole antenna. The phase of these electromotive forces may be readily determined by comparison with the electromotive forces received from the atmosphere with constant phase, such, for example, as those received from a vertical antenna.

It is, of course, understood that these antennæ of the dipole type, having no appreciable inherent selective properties, intercept any electrical energy which may be present in the atmosphere including radio waves of any wave length present, static, or other disturbances. The response produced by the equipment connected with the antenna is thus due to any such energy present which is not excluded by the inherent, or desired, selective properties of the receiving equipment. If the receiving equipment be selective then the response is to only that portion of the atmospheric field having the frequency to which the selective equipment responds. If the wave length received be one to which the receiving dipole is directive, that is, a short wave, or one of about twice the length of the dipole, maximum response will be produced when the antenna is oriented at right angles to the direction of propagation of the received waves, but irrespective of its orientation, when the antenna is rotated about its center point in a vertical plane a minimum of energy is received when it is in the horizontal plane. This is true except when the received waves are horizontally polarized which seldom occurs due to infrequency of use of transmitters of horizontally polarized waves and the tendency of such waves to become vertically polarized at a short distance from the transmitting aerial.

Figure 2:
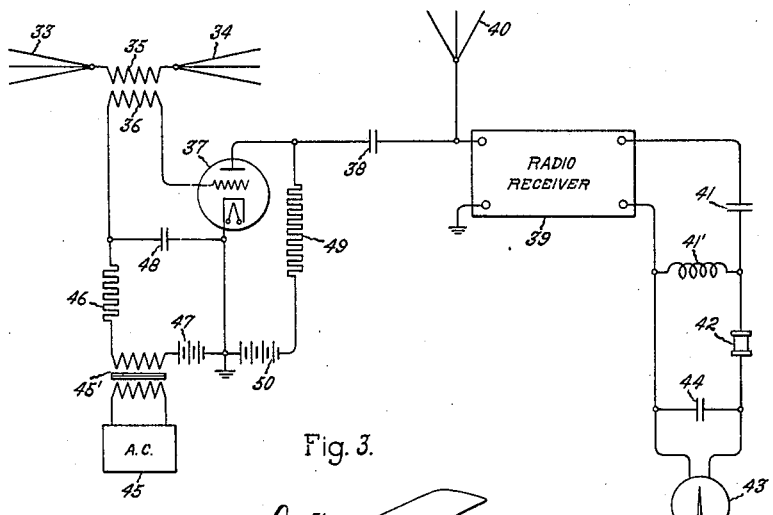
Figure 3:
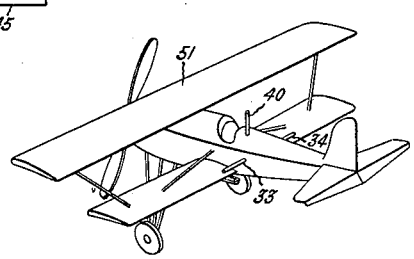

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 shows diagrammatically one form of my invention; Figs. 2 and 5 show diagrammatically the preferred forms of my invention; Fig. 3 is a perspective view of the installation of the antenna used on an aircraft, and Fig. 4 illustrates certain operating characteristics.

Referring to Fig. 1 of the drawings, I have illustrated therein two dipole antennæ 1, 2, and 3, 4, which are arranged at an acute angle to a horizontal plane extending from starboard to port on an aircraft, or in other words, these antennæ are located at acute angles to the horizontal plane and in the vertical plane extending laterally of the aircraft. Two other sets of dipole antennæ 5, 6 and 7, 8 are arranged at acute angles to the horizontal plane extending from fore to aft of the aircraft, or in other words, these antennæ are located at acute angles to the horizontal plane and these antennæ are in a vertical plane extending parallel with the fore and aft axis of the aircraft. While it is not essential to my invention it is pointed out that these dipole antennæ, as is well known in the art, are substantially non-directive in response to all radio waves except those short waves which have a wavelength approximately double the length of the dipole or less. To these waves the dipole responds in the manner of the ordinary horizontal doublet which is, to a small extent, directive. These dipole antennæ are arranged to be connected to a detector 9 which principally because of simplicity in operation preferably has an aperiodic input circuit. If desired, of course, this detector may be tuned to any desired frequency irrespective of the length of the antenna. These antennæ operate to receive space waves such as radio waves and static disturbances and are arranged so that when connected to the detector 9, the received space waves are converted into unidirectional current impulses.

These unidirectional current impulses which appear in the output circuit of the detector 9 are arranged to be impressed upon a plurality of indicating instruments. A pair of commutators driven by a motor 10 operate to connect the detector input to one dipole antenna and to connect the output circuit to the proper indicating instrument. The antenna circuit commutator comprises a ring 11 provided with a plurality of conducting segments connected to the various halves of the dipole antennæ. A pair of brushes 12 and 13 which are connected to the slip rings 14 and 15 contact with the conducting segments of the commutator ring 11. The slip rings 14 and 15 are connected by means of the brushes 16 and 17 to the input circuit of the detector 9. The output circuit of the detector 9 is connected through brushes 18 and 19 to the slip rings 20 and 21. These slip rings 20 and 21 are connected respectively to the brushes 22 and 23 which contact with the conducting segments of the commutator ring 24. The various conducting segments of the commutator ring 24 are connected to the indicating instruments 25 and 26. It will be noted that alternate segments on the commutator ring 11 are connected to the lateral antennæ 1, 2, and 3, 4 and that corresponding segments on the commutator ring 24 are connected to the indicating instrument 26. The remaining alternate conducting segments on the commutator ring 11 are connected to the dipole antennæ 5, 6 and 7, 8 and the corresponding segments on the conductor ring 24 are connected to the indicating instrument 25. The armature 27 of the instrument 25 is connected to a lever 28 having at one of its extremities a representation of an aeroplane 29. The armature 30 of the instrument 26 is connected to a V-shaped bar member 31 which supports across the open portion of the V a line 32. This line 32 may comprise a fine wire supported by the V members 31 or may be an opaque line upon a transparent background such as a piece of celluloid or other light weight transparent material.

When the craft is in a horizontal plane both laterally and longitudinally, each of the dipole antennæ is at the same angle with respect to the horizontal plane and hence, each dipole antenna receives the same amount of energy from the space waves. This received energy when detected by the detector 9, actuates the instruments 25 and 26 so that when viewed from an instrument board on the craft, the reproduction of the aeroplane 29 appears to be directly back of and slightly above the horizontal line 32. If, however, the craft deviates from the horizontal plane in a longitudinal manner so that the craft is climbing, the dipole antenna 5, 6, receives less energy than the dipole antenna 7, 8 because the dipole antenna 5, 6, is nearer to a horizontal plane wherein the dipole antenna connected to an aperiodic circuit receives the minimum amount of energy. Thus the energies received by these two dipole antennæ are transmitted successively to the indicating instrument 25, thereby actuating the armature 27 so that the representation of the aeroplane 29 is tilted upward, and when viewed from the instrument board of the craft, appears to be a considerable distance above the horizontal line 32 which is a simulation of the horizon.

If on the other hand, however, the craft is in a longitudinal horizontal plane but tilted to the port or starboard side of the ship, one of the dipole antennæ 1, 2, or 3, 4, receives a greater amount of energy than the other dipole antenna, with the result that the detected currents actuate the armature 30 of the indicating instrument 29 so as to cause the horizon line 32 to be tilted. Thus when viewed from an instrument board, the representation 29 of an aeroplane appears at an angle to the artificial horizon 32. It will thus be apparent that the dipole antennæ 1, 2 and 3, 4 arranged along the lateral axis give an indication by means of the instrument 25 of the lateral stability of the craft, and the other dipole antennæ 5, 6, and 7, 8 arranged along the longitudinal axis give an indication by means of the indicating instrument 26 and the artificial horizon line 32 of the longitudinal stability of the craft.

Referring to Fig. 2 of the drawings, there is shown therein a dipole antenna 33, 34 coupled by means of an inductor 35 to an input circuit including the inductor 36. This input circuit including the inductor 36 which preferably is aperiodic, is connected to the grid or control element of an electron discharge device 37. The output of the electron discharge device 37 is connected through a suitable coupling capacitor 38 to a space wave amplifier and detector 39 indicated by the term "radio receiver". A second antenna 40 which may be of any suitable type such as a vertical or non-directional antenna arranged in a plane other than the plane of the dipole antenna 33, 34, is also connected to the space wave amplifier and detector 39. The output of this radio receiver 39 is connected to a filter circuit comprising the capacitor 41 and the inductor 41', the purpose of which will be apparent later. The output circuit also includes a non-linear resistor 42 which is connected to an indicating instrument 43. The indicating instrument has connected across its terminals a by-pass capacitor 44 which operates to pass alternating currents past the meter.

The space wave energy received by the dipole antenna 33, 34 is modulated by an alternating current supplied from a source 45 through a transformer 45'. By connecting a resistor 46 between the aperiodic input circuit 36 and the cathode of the discharge device 37, and by properly adjusting the grid bias applied by the source of potential 47, the low frequency modulation impressed upon the received energy will be in the form of an asymmetrical wave. In order to prevent dissipation of the received space waves in the resistor 46, a by-pass capacitor 48 is connected between the cathode of the discharge device and the point between the resistor 46 and the inductor 36. Obviously, of course, any other form of circuit which will provide asymmetrical modulation of the energy received by one of the antennæ may be used, or the source of oscillations 45 may be arranged to supply an asymmetrical wave to the discharge device 37. The purpose of obtaining this distorted wave form will become apparent from the explanation of the operation of this system. The output circuit of the discharge device 37 may include a suitable coupling resistor 49 and a source of anode potential 50.

The manner in which the dipole antenna 33, 34 and the vertical antenna 40 are arranged on an aircraft 51 may be observed by referring to Fig. 3 wherein the dipole antenna 33 and 34 is indicated as rods extending horizontally from the fuselage of an aeroplane and the vertical antenna 40 may comprise another rod arranged in a suitable position back of the pilot's or observer's seat.

When the aircraft 51 is in a position so that the wings are in a horizontal plane, the dipole antenna 33, 34 will receive a minimum of energy from the space waves. If, however, the craft deviates from the horizontal position, the dipole antenna receives energy which is modulated by the discharge device 37. These modulated oscillations are combined with oscillations received from the vertical antenna 40 and the resultant oscillations are demodulated by the radio receiver 39. The oscillations received by the dipole antenna may be combined with those received from the vertical antenna either in phase or opposed phase relation depending upon the position of the dipole antenna with respect to the horizontal plane. In order to provide constant sensitivity of indication as to the amount of angular deviation from the horizontal of the dipole antenna, the demodulator or radio receiver 39 is preferably provided with an automatic volume control. The combined oscillations when demodulated by the radio receiver 39 appear in the output circuit in the form of an asymmetrical wave. This asymmetrical wave then passes on to the non-linear resistor 42.

The non-linear resistor 42 is preferably of the type described in United States Patent No. 1,822,742 issued September 8, 1931, to K. B. McEachron, and is commercially known as "Thyrite". The resistance and current relationship of such non-linear resistor material can be expressed in the form of a simple hyperbolic equation: $R=CI^{-a}$, where R is the resistance, I is the current, and C and $a$ are constants. The exponent $a$ is less than unity and the constant C preferably ranges between 20 and 600. This material has the peculiar property of reacting substantially instantaneously to asymmetrical wave shapes so that a direct current flows in the circuit, but when symmetrical waves are passed through it, no direct current flow occurs. This direct current flow may be in either direction depending upon whether the positive or negative values of the asymmetrical wave shape are greater. The resultant direct current flow actuates the zero center indicating meter 43 to give an indication as to whether the right or left wing is above the horizontal plane. In other words, the indicating device 43 may indicate the direction in which the ailerons of the craft must be actuated to bring the ship into a horizontal plane, thereby rotating the dipole antenna 33, 34 to a null position. The filter comprising the capacitor 41 and the inductor 41' operates to attenuate those frequencies which may appear in the output circuit other than the asymmetrical wave from source 45 which is modulated upon the energy received by the dipole antenna. The by-pass capacitor 44 connected across the indicating instrument 43 serves to shunt any alternating currents which may pass through the non-linear resistor 42.

Reference may now be had to Fig. 4 wherein the curve A illustrates the manner in which the wave impressed upon the demodulator in the radio receiver 39 appears when the energy received by the vertical antenna 40 is combined in phase with the energy received by the dipole antenna 33, 34. The curve B shows the currents appearing in the output circuit of the radio receiver when the modulations are combined as illustrated in curve A. If the dipole antenna 33, 34, however, is in a different position, i. e., so it is rotated from the horizontal in a direction opposite to that which produced the currents illustrated at A, the currents combined will be in opposed phase relation, thus producing the currents shown at C. The currents then appearing in the output circuit of the radio receiver appear as shown at D. Thus in one instance when the dipole antenna is rotated from the horizontal plane in one direction, the resulting demodulation currents in the output circuit may be such as shown by the curve B, which when acted upon by the non-linear resistor 42, produces a direct current flow through the indicating meter 43 in one direction, whereas if the dipole antenna 33, 34 is rotated in the opposite direction, the resulting demodulation currents are of the form shown at D which when acted upon by the non-linear resistor 42, cause a direct current to flow through the indicating meter 43 in the opposite direction. As the radio receiver 39 is equipped with an automatic volume control which operates primarily in response to the energy received by the vertical antenna 40, the amplitudes of the wave forms A and C supplied to the demodulator in the receiver 39 are equal so as to produce low frequency currents such as shown at B and D of equal amplitude, thereby providing symmetrical indication of the angular deviation of the dipole antenna 33, 34 irrespective of the direction of rotation from the horizontal plane. From this it will be apparent that the arrangement disclosed in Figs. 2 and 3 operate to indicate to the pilot that the axis along which the dipole antennæ have been placed upon the craft is no longer in a horizontal plane. Obviously, of course, a dipole antenna 33, 34 could be arranged along the longitudinal axis of the aeroplane 51 in which case, of course, the indicating instrument 43 would show the pilot as to whether or not the nose of the craft is heading upward or downward. It is to be understood, however, that the space wave amplifier and demodulator may comprise any suitable radio receiving circuit, preferably equipped with automatic volume control, and including audio and radio frequency amplifiers. As long as the craft is in a horizontal position the radio receiver may be used to receive communication, in which instance the output circuit of the receiver will be provided with headphones or a suitable loudspeaker.

Referring to Fig. 5, I have shown therein a system somewhat similar to the arrangement disclosed in Fig. 2, with the addition of a dipole antenna arranged so that indications may be obtained which show the longitudinal stability as well as lateral stability of the craft. In order to simplify the disclosure, parts similar to Fig. 2 are given similar reference numerals. The dipole antenna 52, 53 is arranged horizontally along the longitudinal axis of the craft. This dipole antenna is coupled to the aperiodic input circuit of the discharge device 56 by means of the inductor 54, coupled to an inductor 55. The output of the discharge device 56 which includes a coupling resistor 57 and a suitable source of anode potential 58 is connected to the input of the radio receiver 39 through a coupling capacitor 59. Energy from a source of alternating current 60 is impressed upon the input circuit of the discharge device 56 through a transformer 61. A resistor 62 connected between the input circuit of the discharge device 56 and the cathode of the discharge device in conjunction with a suitable source of grid bias potential operates to cause the low frequency modulation impressed upon the received energy to be in the form of an asymmetrical wave.

A motor 63 operates to rotate a shaft having thereon a two-section commutator 64, slip rings 65 and 66, and commutators 67 and 68. One segment of the commutator 64 is connected to the slip ring 65 and the other segment of the commutator 64 is connected to the slip ring 66. The slip ring 66 is connected through a brush and lead 67 to the negative terminal of the biasing source of potential 47 which is adjusted to a value just sufficient to cause the discharge devices 37 or 56 to operate as asymmetrical modulation devices. The source of negative biasing potential 68 having its positive pole connected to the negative pole of the biasing potential source 47 is connected through the lead 69 to the brush which makes contact with the slip ring 65. The biasing potential 68 provides sufficient additional negative bias to cause the discharge device 37 or 56 to be at anode current cut-off when this source of potential is connected in the grid circuit. With the commutator 64 in the position shown in the figure, the grid circuit of the discharge device 37 may be traced as follows: from the grid through the inductor 36, the resistor 46, the secondary of the transformer 45, lead 70, segment of the commutator 64, conductor 71, slip ring 65, lead 69, biasing potential sources 68 and 47 to the cathode of the discharge device. As thus arranged, the discharge device 37 has sufficient negative bias impressed upon the grid thereof to prevent the discharge device from operating.

The grid circuit of the discharge device 56 is as follows: from the grid through the inductor 55, resistor 62, secondary winding of the transformer 61, lead 72, brush making contact with one segment of the commutator 64, lead 73, slip ring 66, conductor 67, biasing source of potential 47 to the cathode of the discharge device. The biasing potential impressed upon the grid of the discharge device 56 is just sufficient to cause proper operation of the device as an asymmetrical modulating device. Thus in effect the dipole antenna 33, 34 is at this instant disconnected from the radio receiver 39 and the dipole antenna 52, 53 is effective. The output of the radio receiver 39 including the conductors 74 and 75 is connected to the commutators 67 and 68 which at this instant are connected to the indicating device 76 by means of the conductors 77 and 78. The device 76 indicates the longitudinal stability of the craft and may constitute an instrument similar to the device 25 illustrated in Fig. 1.

When the motor 63 has rotated its shaft 180 degrees, the grid circuit of the discharge device 37 will include only the biasing potential 47, thus causing the tube to become operative, and the grid circuit of the discharge device 56 will include the biasing potential sources 47 and 68 thereby causing the tube to become inoperative. Thus in this position the dipole antenna 33, 34 receives energy which is impressed upon the radio receiver 39, and the dipole antenna 52 and 53 is effectively disconnected. In this position the output of the radio receiver 39 is connected through the lead wire 74, 75 to the commutator 67, 68 so that the instrument 43 is connected to the output. The instrument 43 therefore indicates the lateral stability of the craft and may comprise an instrument similar to device 26 illustrated in Fig. 1. The commutating arrangement actuated by the motor 63 permits the use of lateral and longitudinal dipole antennæ with but one radio receiver. Any other arrangement for performing the commutating action as for instance an electron discharge tube arrangement may be substituted inasmuch as the showing is merely schematic.

I particularly contemplate the use of my invention in connection with static waves and radio waves of length long as compared with the length of the antennæ employed, that is waves of such length relative to the length of the dipole that the dipole is practically non-directive. It will be understood that it is in no wise limited to waves of any particular wave length and may be employed in connection with short waves as well. Of course, horizontal antennæ are frequently employed as receptors of short radio waves having a length twice the length of the antenna but even these antennæ produce a minimum of response when in the horizontal plane and find their principal utility in that plane by reason of their directivity at such a wavelength. Since my invention is dependent upon variation of response of the equipment when the antenna is varied in position in the vertical plane, its response is in no wise impaired by the horizontal directivity of the antennæ employed.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention as set forth in the appended claims.

What I claim as new and desire to secure by Letters Patent of the United States, is:

1. The combination, in a system for providing an artificial horizon for air craft, of radiant energy receiving means on said craft for producing a plurality of periodically varying currents having a phase relation dependent upon the position of said craft with reference to a horizontal plane irrespective of the direction from which the radiant energy is received, and means responsive to said phase relation to produce a unidirectional current having a polarity dependent upon the position of said craft with reference to said horizontal plane.

2. The combination, in a system for providing an artificial horizon for air craft, of radiant energy receiving means on said craft for producing a plurality of periodically varying currents having a phase relation dependent upon the position of said craft with respect to a horizontal plane and independent of the direction from which radiant energy is received, means including a non-linear resistor for producing a direct current component in response to said phase relation, and a device connected to said last means and energized responsively to said direct current component.

3. In an aeronautical instrument, the combination of an antenna normally arranged in a horizontal plane, a second antenna arranged in a different plane, said antennæ operating to receive space waves in said different planes, said received space waves having a phase relation dependent upon the position of said first antenna with respect to a horizontal plane and independent of the position of the craft relative to the source of said received energy, and means for producing a distinctive response in accordance with said phase relation.

4. In a system for air craft, the combination of a dipole antenna mounted horizontally on said craft, a second antenna mounted in a different plane, said antennæ operating to receive space waves in said different planes, said space waves having a phase relation dependent upon the position of said first antenna with respect to a horizontal plane and independent of the direction of propagation of the received waves, and means responsive to said phase relation for producing direct currents having a polarity dependent upon said phase relation.

5. In an aeronautical instrument, the combination of an antenna arranged normally in a horizontal plane, said antenna being substantially non-directive to received waves, a second antenna arranged in a different plane, said antennæ operating to receive space waves in said different planes, means for modulating one of said received space waves to produce an asymmetrically modulated wave, means for combining said modulated wave with the wave received by said other antenna, and means responsive to said combined waves for producing a direct current variable in accordance with the deviation of said first antenna from the horizontal plane.

6. The combination, on an air craft, of a dipole antenna mounted horizontally on said craft along one of the axes of said craft, a second antenna mounted in a different plane, said antennæ operating to receive space waves in said different planes, said received space waves having a length such that said dipole has substantially no directive effect and a phase relation dependent upon the position of said dipole antenna with respect to a horizontal plane, and means responsive to said phase relation for producing direct currents variable in magnitude and polarity in accordance with the position of said axis of said craft with respect to a horizontal plane.

7. The combination, on an air craft, of a dipole antenna connected to an aperiodic circuit, a second antenna, said antennæ operating to receive space waves having a length such that said dipole antenna has substantially no directive effect, means for modulating one of said received waves to produce an asymmetrically modulated wave, means for combining and demodulating said waves to produce distinctive currents, and means responsive to said distinctive currents for producing direct currents variable in accordance with the position of said dipole antenna with respect to a horizontal plane.

8. The combination, on an air craft, of a plurality of dipole antennæ arranged along the lateral axis of said craft and at acute angles to the horizontal plane, said antennas operating to receive space waves, means for producing unidirectional currents in accordance with magnitudes of the received space waves, and means responsive to said unidirectional currents for determining the lateral stability of said craft.

9. The combination, on an air craft, of a plurality of dipole antennæ arranged along the longitudinal axis of said craft and at acute angles to the horizontal plane, said antenna operating to receive space waves, means for producing unidirectional currents in accordance with magnitudes of the received space waves, and means responsive to said unidirectional currents for determining the longitudinal stability of said craft.

10. The combination, on an air craft, of a plurality of dipole antennæ arranged along the lateral axis of said craft and at acute angles to the horizontal plane, a plurality of antennæ arranged along the longitudinal axis of said craft and at acute angles to the horizontal plane, all of said antennæ operating to receive space waves, means for comparing the magnitudes of the space waves received by each group of said dipole antennæ, to determine the lateral stability and the lonigtudinal stability of said craft.

11. The method of guiding aircraft with respect to its position relative to the horizontal, which includes receiving energy on the craft from the atmosphere in such a way that as the craft deviates from the horizontal position said received energy varies in a manner which is independent of the direction of propagation of said energy in the atmosphere, and guiding the craft in accordance with the variations produced in said electromotive force as the craft varies from the horizontal position.

12. The method of guiding aircraft with respect to its position relative to the horizontal, which includes receiving electrical energy upon the craft dependent in magnitude upon the position of the craft in the atmospheric potential gradient in a vertical plane, and guiding the craft in accordance with said received energy.

13. The method of guiding an aircraft with respect to its position relative to the horizontal, which includes receiving electrical energy upon the craft in such a way that said energy varies when the craft deviates from the horizontal position in a manner unaffected by the position of the craft relative to the point of origin of said energy, and guiding the craft in accordance with said variations.

14. The method of guiding aircraft with respect to its position relative to the horizontal, which includes receiving electrical energy upon the craft in such a way that the phase of the received energy is dependent upon the direction of deviation of the craft from the horizontal irrespective of the position of the craft relative to the source of received energy, and guiding the craft in accordance with the phase of said received energy.

15. The method of guiding aircraft with respect to its position relative to the horizontal, which includes utilizing the atmospheric potential gradient in a vertical plane produced by such extraneous sources of radiant energy as may be present in the atmosphere, to produce a response on the craft when the craft occupies a position in said potential gradient other than horizontal, and guiding the craft in accordance with said response.

HOWARD I. BECKER.